United States Patent [19]
Tabata

[11] Patent Number: 5,577,761
[45] Date of Patent: Nov. 26, 1996

[54] SUSPENSION SYSTEM OF VEHICLE HAVING DAMPING MEANS BY ROTARY DAMPER

[75] Inventor: Mitsuhiro Tabata, Nishikamo, Japan

[73] Assignee: Toyota Jidosha Kabushiki Kaisha, Toyota, Japan

[21] Appl. No.: 404,154

[22] Filed: Mar. 14, 1995

[30] Foreign Application Priority Data

Mar. 15, 1994 [JP] Japan ................................ 6-70056
Feb. 17, 1995 [JP] Japan ................................ 6-70056

[51] Int. Cl.$^6$ ................................................ B60G 11/26
[52] U.S. Cl. .................. 280/705; 280/723; 280/702; 188/306
[58] Field of Search ............................... 280/705, 702, 280/709, 721, 723; 188/290, 306, 308

[56] References Cited

U.S. PATENT DOCUMENTS

| | | | |
|---|---|---|---|
| 1,778,905 | 10/1930 | Mitchell | 188/290 |
| 2,032,289 | 2/1936 | Lacroix | 188/306 |
| 5,324,065 | 6/1994 | Derrien et al. | 188/306 |

FOREIGN PATENT DOCUMENTS

| | | |
|---|---|---|
| 2516619 | 5/1983 | France .................. 188/306 |
| 2-283511 | 11/1990 | Japan . |
| 62-64952 | 8/1994 | Japan . |
| 62-27224 | 8/1994 | Japan . |
| 62-27222 | 8/1994 | Japan . |
| 62-19117 | 8/1994 | Japan . |
| 62-27223 | 8/1994 | Japan . |
| 62-78439 | 10/1994 | Japan . |

*Primary Examiner*—Paul N. Dickson
*Attorney, Agent, or Firm*—Cushman, Darby & Cushman

[57] ABSTRACT

In a suspension system of a vehicle such as an automobile, a rotary damper having two relatively rotatable damper members is incorporated therein to damp the bounding and rebounding movement of a vehicle wheel, one of the damper members being incorporated in a carrier for rotatably supporting the vehicle wheel such that a damper rotation axis of the rotary damper is in alignment with a wheel rotation axis.

10 Claims, 14 Drawing Sheets

SUSPENSION SYSTEM OF VEHICLE HAVING DAMPING MEANS BY ROTARY DAMPER

BACKGROUND OF THE INVENTION

1. Field of the Invention

The present invention relates to a suspension system of a vehicle, and more particularly, to a damping means by a rotary damper for a suspension system of a vehicle such as an automobile.

2. Description of the Prior Art

The suspension system of a vehicle such as an automobile generally requires a damping means incorporated therein so as to damp the bounding and rebounding movement of the vehicle wheel relative to the vehicle body. Since the bounding and rebounding movement of the vehicle wheel is a substantially linear movement, the damping means of the suspension system is generally constructed as a linear damping means consisting of a linear cylinder and a linear piston. However, since the vertical dimension of the space available for mounting such a linear damper is relatively limited, the maximum stroke of the linear damper is correspondingly limited, thus correspondingly limiting the maximum bounding and rebounding stroke of the vehicle wheel, much less if a higher stability of stroking engagement between the cylinder and the piston is ensured.

A rotary damper is known as a means for providing a damping effect against a relative rotation movement between two damper members adapted to rotate relative to one another about a common axis. Since the relative rotation movement between the two damper members can be readily converted into a substantially linear relative movement of a certain desired stroke by means of a pair of arm members each having an appropriate arm length and connected with each of the two rotary damper members, it will be more convenient in some cases to employ a rotary damper for damping the bounding and rebounding movement of the vehicle wheel relative to the vehicle body.

In Japanese Patent Application No. 5-284077, it was proposed to use a rotary damper for damping the bounding and rebounding movement of a carrier for a vehicle wheel such that one of the two relatively rotatable damper members of the rotary damper is firmly mounted to the carrier adjacent a seat of a suspension spring at a front or a rear side thereof, while the other of the relatively rotatable damper members is supported from a corresponding portion of the vehicle body via an articulated reaction link mechanism which converts the bounding and rebounding movement of the vehicle wheel relative to the vehicle body into a corresponding rotational movement of said other damper member relative to said one damper member.

However, in such a construction that the rotary damper is mounted to the carrier adjacent the spring seat to be on a front or a rear side thereof, the mass of the rotary damper displaced substantially from the central axis of the carrier exerts a relatively large unbalanced force to the carrier due to its inertia induced at every turn between the bounding and the rebounding movement of the vehicle wheel which undesirably affects the alignment of the suspension system.

SUMMARY OF THE INVENTION

In view of the above-mentioned problems in the conventional or prior art of damping the bounding and rebounding movement of the vehicle wheel relative to the vehicle body, it is a first object of the present invention to provide an improved suspension system of a vehicle incorporating a rotary damper as a means to damp the bounding and rebounding movement of a vehicle wheel relative to a vehicle body by obviating such a problem that the inertial mass of the damper affects the alignment of the suspension system.

Further, it is a second object of the present invention to provide such an improved suspension system so as to be readily adjustable of the performance thereof regarding the relation between the relative rotation angle of the two relatively rotatable damper members and the magnitude of the bounding and rebounding of the carrier.

Still further, it is a third object of the present invention to provide such an improved suspension system at a lower cost than the proposal by the above-mentioned Japanese patent application.

According to the present invention, at least the first one of the above-mentioned objects is accomplished by a suspension system of a vehicle having a vehicle body and at least one vehicle wheel, comprising:

a carrier for supporting said vehicle wheel to be rotatable about an axis of rotation thereof;

a means resiliently supporting said carrier against said vehicle body for a bounding and rebounding movement of said vehicle wheel relative to said vehicle body; and a damping means for damping said bounding and rebounding movement of said vehicle wheel relative to said vehicle body, said damping means comprising:

a rotary damper having a first damper member firmly connected with said carrier, a second damper member rotatable relative to said first damper member about an axis of rotation thereof, and a means for damping a relative rotation movement between said first and second damper members about said damper rotation axis, and a reaction member supporting a portion of said second damper member substantially remote from said damper rotation axis against a portion of said vehicle body such that said bounding and rebounding movement of said carrier relative to said vehicle body causes a corresponding rotation movement of said second damper member relative to said first damper member about said damper rotation axis, wherein said first damper member of said rotary damper is incorporated in said carrier such that said damper rotation axis is in alignment with said wheel rotation axis.

By the rotary damper being incorporated in the carrier such that the damper rotation axis is in alignment with the wheel rotation axis, both of the reaction force applied through the link and the inertial force applied by the mass of the rotary damper during the bounding and rebounding movement of the vehicle wheel traverse the central axis of the carrier, whereby any undesirable effects of the reaction force and the inertial force against the alignment of the suspension system are substantially decreased, thus substantially improving the stability of adjustment of the carrier.

Further, according to the present invention, the above-mentioned second object is particularly accomplished, in addition to the above-mentioned first object by a suspension system having the above-mentioned basic construction, wherein said reaction member comprises a link member having a first end pivotably connected with said second damper member at said portion thereof substantially remote from said damper rotation axis and a second end remote from said first end thereof and pivotably connected with said vehicle body at said reaction member supporting portion thereof, said first pivot end of said link member being positioned on a first side of a trace of said wheel rotation axis in the bounding and rebounding movement of said carrier to be apart from said wheel rotation axis with a first distance such that a line connecting said first pivot end and said damper rotation axis makes an angle of substantially a half of right angle against said trace as viewed in a direction of extension of said wheel rotation axis when said carrier is at a neutral position of the bounding and rebounding movement thereof, while said second end of said link member is remote from said first pivot end thereof with a second distance substantially greater than said first distance and positioned on a second side opposite to said first side of said trace.

By such an arrangement, as will be appreciated from the detailed descriptions made hereinbelow, the performance regarding the angle of rotation between the two relatively rotatable damper members against the amount of bounding and rebounding of the carrier can be desirably adjusted, providing a relatively large ratio of said rotation angle to the amount of bounding and rebounding stroke, while allowing the carrier to make a relatively large bounding and rebounding stroke.

In the above-mentioned construction, said carrier supporting means may comprise a suspension arm member having a first end firmly connected with said carrier and a second end pivotably connected with a portion of said vehicle body and extending substantially in a longitudinal direction of the vehicle such that said trace of said damper rotation axis in the bounding and rebounding movements of said carrier is an arc, said second end of said link member pivotably connected with the vehicle body being positioned on the same side as said second end of said suspension arm member pivotably connected with the vehicle body with respect to said arc trace.

By such an arrangement, the ratio of angle of rotation between the relatively rotatable damper members to the amount of bounding and rebounding movement of the carrier is further increased, providing a wider convenience for the design of the rotary damper.

Further, as a further modification, said second damper member may have a series of gear teeth centered at said damper rotation axis, while said reaction member is a rack member having a first end pivotably mounted to said reaction member supporting portion of said vehicle body and a series of rack teeth engaged with said gear teeth of said second damper member such that said second damper member is driven into corresponding rotation movements about said damper rotation axis by said rack member when said carrier bounds and rebounds relative to said vehicle body.

This modification is more effective in cancelling the effect of the inertial mass of the rotary damper against the alignment of the suspension system, because there is no mass of link which acts against the suspension.

According to the present invention, the above-mentioned third objects is particularly accomplished, in addition to the above-mentioned first object, by a suspension system having the above-mentioned basic construction, wherein said carrier and said first alternatively said second damper member are constructed to be integral or telescopingly assembled with one another. In more detail, said first damper member may be constructed to form an integral or a telescoped outer circumferential portion of said carrier, with said second damper member having an annular construction being arranged radially outward around said first damper member so as to define at least one annular damping chamber therebetween, or alternatively, said first damper member may be constructed to form an integral or a telescoped inner circumferential portion of said carrier, with said second damper member being arranged radially inward in said first damper member so as to define at least one annular damping chamber therebetween.

has an annular hub member, and a spindle member supported by said hub member to be rotatable about said wheel rotation axis, said first damper member being formed as an integral part of said hub member.

By such an arrangement, said first damper member can be obtained at a low cost as an integral part of said carrier or by a simple and low cost telescoping assembly process.

BRIEF DESCRIPTION OF THE DRAWINGS

In the accompanying drawings.

DESCRIPTION OF THE PREFERRED EMBODIMENTS

In the following, the present invention will be described in more detail with respect to some preferred embodiments with reference to the accompanying drawings.

Figure 1:
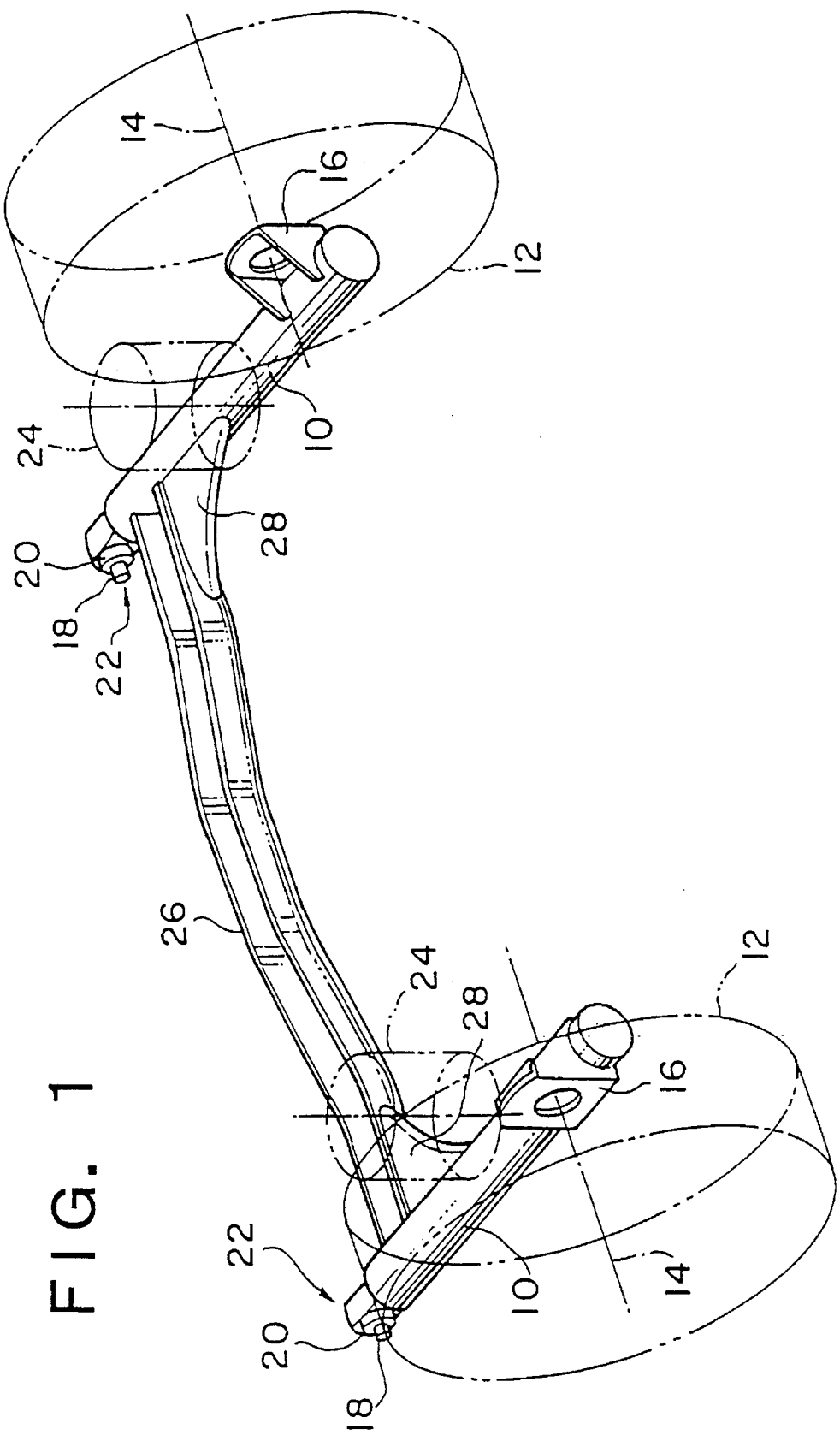
FIG. 1 is a perspective view of a frame assembly of a suspension system for a pair of vehicle wheels of a vehicle to which a pair of carriers each incorporating a rotary damper according to the present invention are mounted as described in detail with reference to the succeeding figures.

FIG. 1 shows a frame assembly of a suspension system for a pair of vehicle wheels in which an embodiment of the present invention is incorporated. The basic construction of this frame assembly is conventional, although it embodies a part of the novel concept of the present invention in that it has no means required to mount a rotary damper, because a rotary damper is mounted to the carrier for a vehicle wheel. The frame assembly is assembled together with a pair of combination assemblies of carrier and rotary damper shown in FIGS. 2–4. In FIG. 1, 10 is a pair of suspension arms each of which is adapted to support a vehicle wheel 12 to be rotatable about a wheel rotation axis 14 via a bracket 16 firmly mounted thereto adjacent a rear end thereof and the combination assembly of rotary damper and carrier shown in FIGS. 2–4. Each of the pair of arms 10 extends substantially horizontally from the rear end thereof toward a front end thereof pivotably mounted to a portion of a vehicle body (not shown in FIG. 1) by a pivotal mounting means 22 including a pivot shaft 18 and a rubber bush 20. Each arm 10 is adapted to be elastically supported against the vehicle body not shown by a coil spring 24 diagrammatically illustrated, while the pair of the suspension arms 10 are combined with one another by a twist beam 26 extending transversely in the vehicle. The connection between each of the suspension arms 10 and the twist beam 26 is reinforced by a corner bracket 28.

Figure 2:
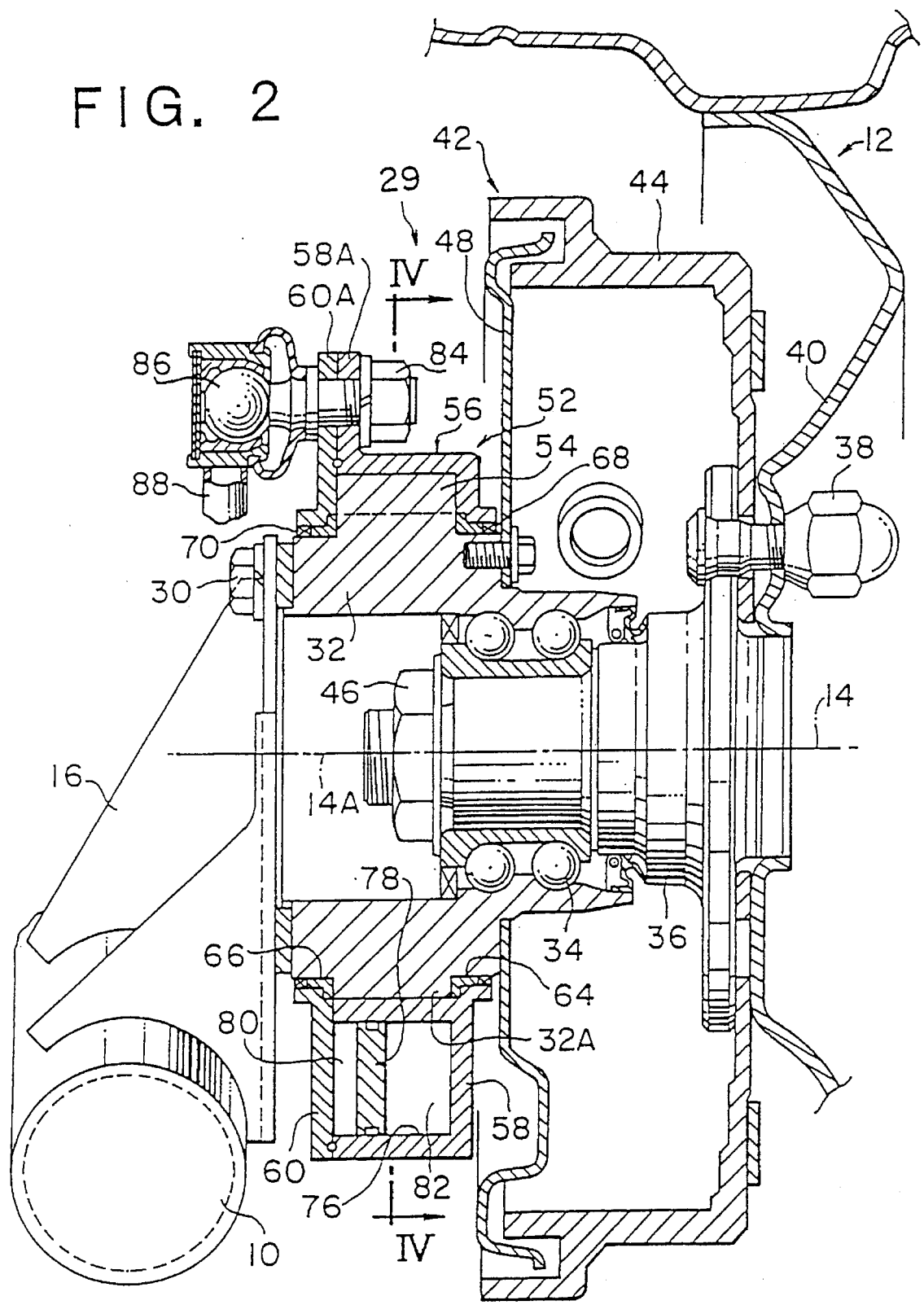
FIG. 2 is a longitudinal sectional view of a combination assembly of a carrier for rotatably supporting a vehicle wheel and a rotary damper according to the present invention, the combination assembly being mounted to the frame assembly shown in FIG. 1.
Figure 3:
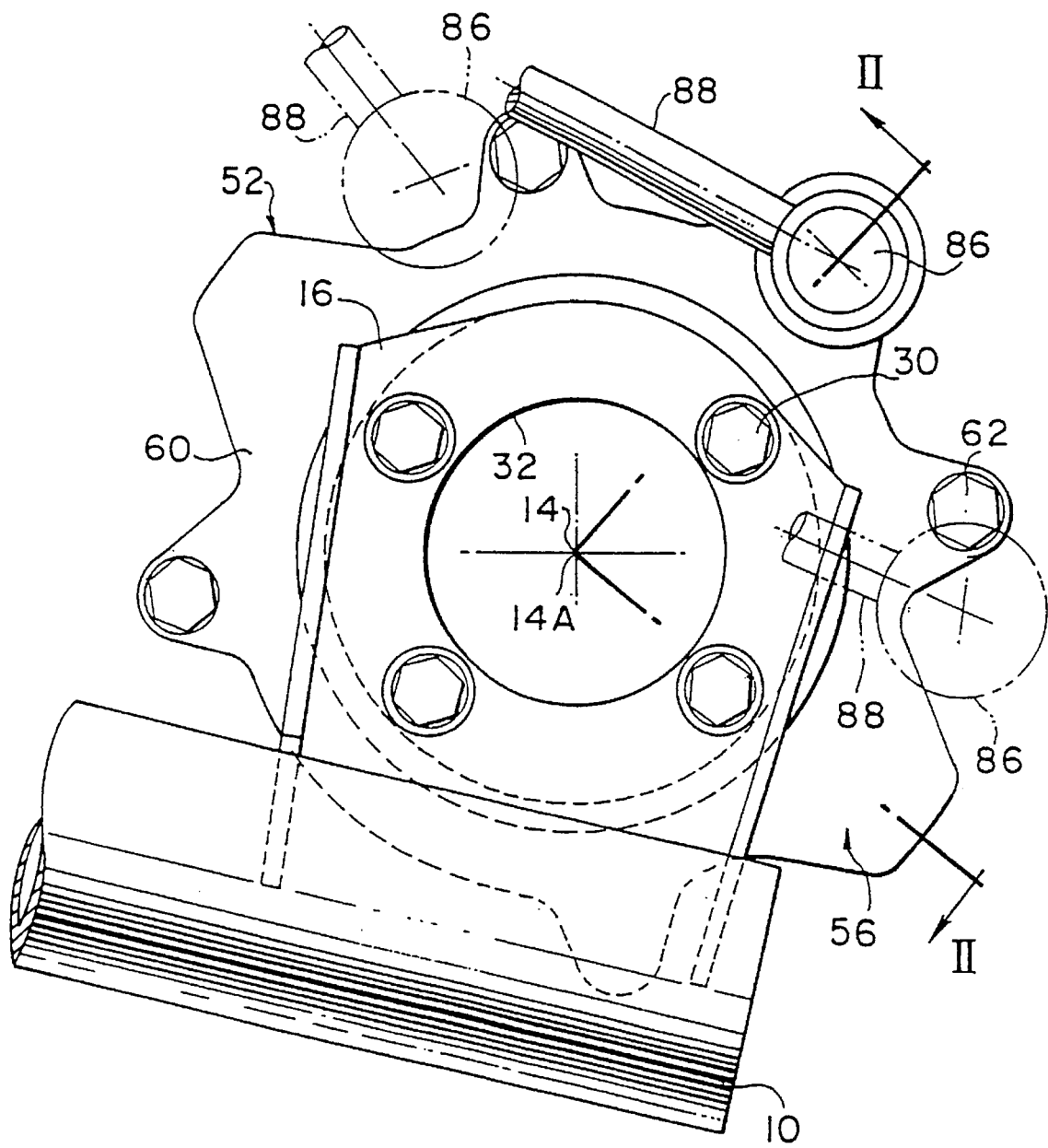
FIG. 3 is a side view of the combination assembly of carrier and rotary damper shown in FIG. 2, the side view being a view from the left side thereof to rightward in FIG. 2.
Figure 4:
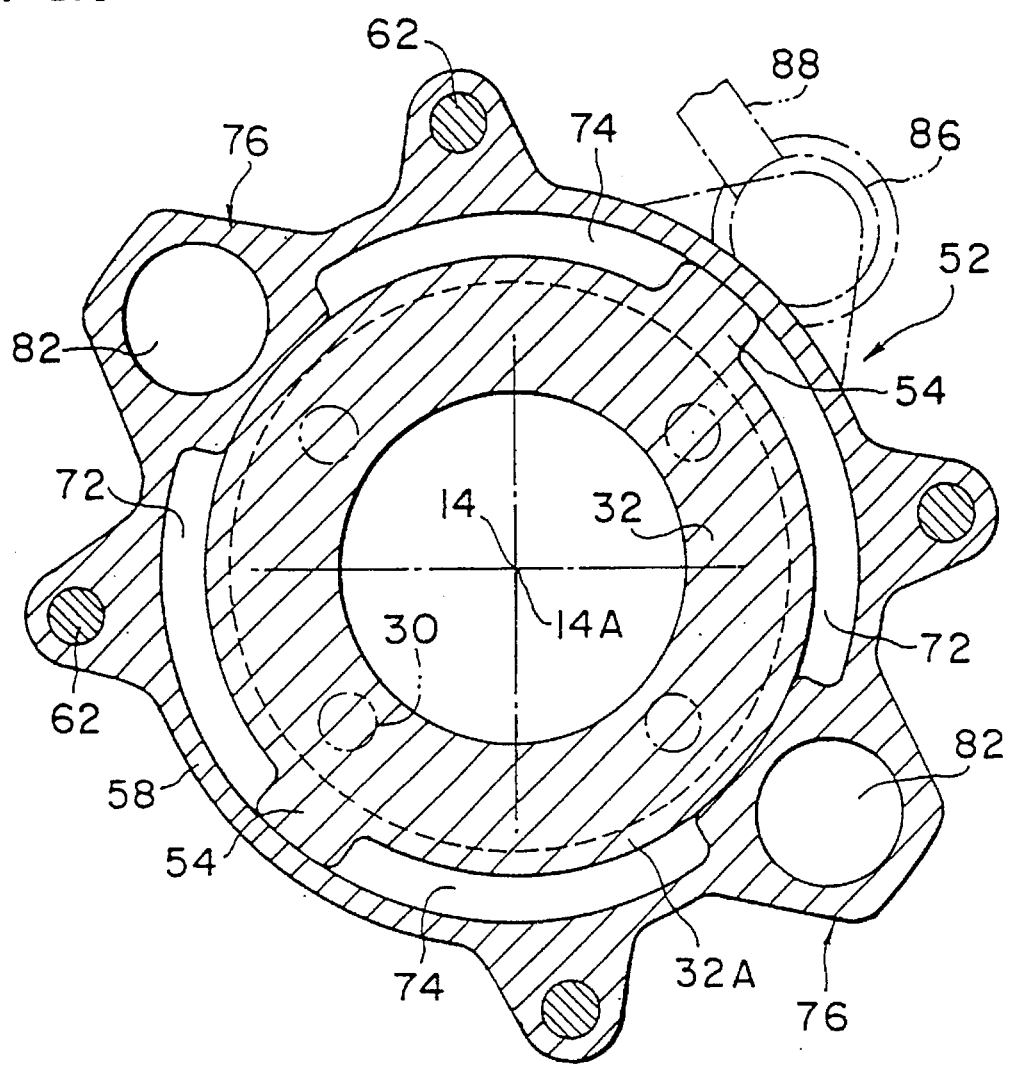
FIG. 4 is a cross sectional view along line IV—IV in FIG. 2, showing a cross section of an essential part of the rotary damper in the combination assembly shown in FIG. 2.

Referring to FIGS. 2–4, the combination assembly of carrier and rotary damper totally designated by reference numeral 29 is mounted to the suspension arm 10 via the bracket 16. The carrier is in turn a combination of a hub member 32 and an axle member 36 for supporting the vehicle wheel 12 to be rotatable about the wheel rotation axis 14, while the rotary damper is a construction generally designated by 52 and described in detail hereinbelow, having the hub portion 32 in common with the carrier as a part of the construction thereof. The combination assembly 29 is mounted to the bracket 16 by fastening means such as bolts 30. As shown in FIG. 3, four such bolts are provided and are received at the hub member 32 of the combination assembly of carrier and rotary damper.

The hub member 32 supports an axle member 36 via a ball bearing 34 to be rotatable about the wheel rotation axis 14. The axle member 36 has a disk-shaped end portion adapted to be fastened together with a wheel disk 40 of the vehicle wheel 12 and a drum member 44 of a brake 42 by a plurality of bolt-nut means 38, only one of which is shown in FIG. 2. The axle member 36 is axially fastened to an inner lace of the ball bearing 34 by a nut 46 at an inside end thereof. The brake 42 includes a cover member 48 mounted to the hub member 32 by a plurality of bolts designated by 68.

The rotary damper 52 is constructed by a radially outer circumferential portion of the hub 32 and an annular housing 56 mounted around the hub member 32. The housing 56 is composed of a main housing member 58 and a sub-housing member 60 axially assembled together such that their outer flange portions 58A and 60A are axially abutted to one another and fastened together by a plurality of bolt-nut means 62. The annular housing 56 and the hub member 32 are coaxially engaged to be rotatable relative to one another about a common central axis 14A thereof aligned with the wheel rotation axis 14, with interposition of annular bearing elements 64 and 66. The annular slidable engagement between the housing 56 and the hub member 32 is sealed by a pair of annular seal elements 68 and 70 at axially opposite sides thereof. As shown in FIG. 4, a pair of arcuate fluid chambers are defined between the housing 56 and the hub member 32, each of which is divided into arcuate sub-chamber spaces 72 and 74 by each of a pair of diametrically opposite projections 54 formed as an integral part of the hub member 32, the projections 54 each operating as a vane traversing the arcuate chamber space such that, when the housing 56 and the hub member 32 rotate relative to one another about the common central axis 14A, the volumes of the arcuate chamber spaces 72 and 74 are complementarily increased or decreased relative to one another.

On the other hand, as shown in FIG. 2, the main housing member 58 is formed with a pair of cylindrical grooves 76 at diametrically opposite portions thereof, said cylindrical grooves 76 each being closed at one axial end thereof, while the other open end thereof is closed by the sub-housing 60 such that a pair of cylinder chambers are defined to operate as a pair of accumulators. Each of the pair of the accumulator chambers 76 is divided into chamber spaces 80 and 82 by a free piston 78 slidably received therein. Each one of the chamber spaces designated by 80 is connected with each one set of the arcuate chamber spaces 72 and 74 through fluid passages not shown in the figure. Each set of the chamber spaces 72, 74 and 80 are filled with oil. In contrast, each chamber space 82 is filled with air at an elevated pressure. The pair of accumulator constructions provided by the cylindrical grooves 76 and the free pistons 78 operate to absorb the change of volume of the oil filled in said chamber spaces and fluid passages according to changes of temperature.

The rotary damper 52 may be so constructed that the flow of oil between the chamber spaces 72 and 74 according to the relative rotation movement between the housing 56 and the hub member 32 about the common central axis 14A to occur through a clearance between the vane projection 54 and the mating wall surface of the chamber spaces 72 and 74 such that the resistance applied to the flow of oil is determined by the design of said clearance. Alternatively, or in addition thereto, a fluid passage may be formed through the wall of the hub member 32 or the housing 56 to communicating the chamber spaces 72 and 74 with a throttling portion for controlling the resistance of the flow of oil between the chamber spaces 72 and 74. By the oil being transferred from one of the chamber spaces 72 and 74 toward the other thereof through said clearance or the throttling portion according to the relative rotation movement between the housing 56 and the hub member 32, the rotational power exerted between the housing 56 and the hub member 32 is damped.

A ball joint 86 is mounted to a portion of the outer flanges 58A and 60A by a nut 84, so as to be substantially remote from the central axis 14A, thereby providing an arm length with respect to the housing 56, i.e. one of the two relatively rotatable members of the rotary damper. One end of a connection link 88 is mounted to the ball joint 86 such that the connection link 88 is pivotable relative to the housing 56. The other end of the connection link 88 is, as diagrammatically shown in FIG. 5, pivotably mounted at a point 90 of a vehicle body 92A.

Figure 5:
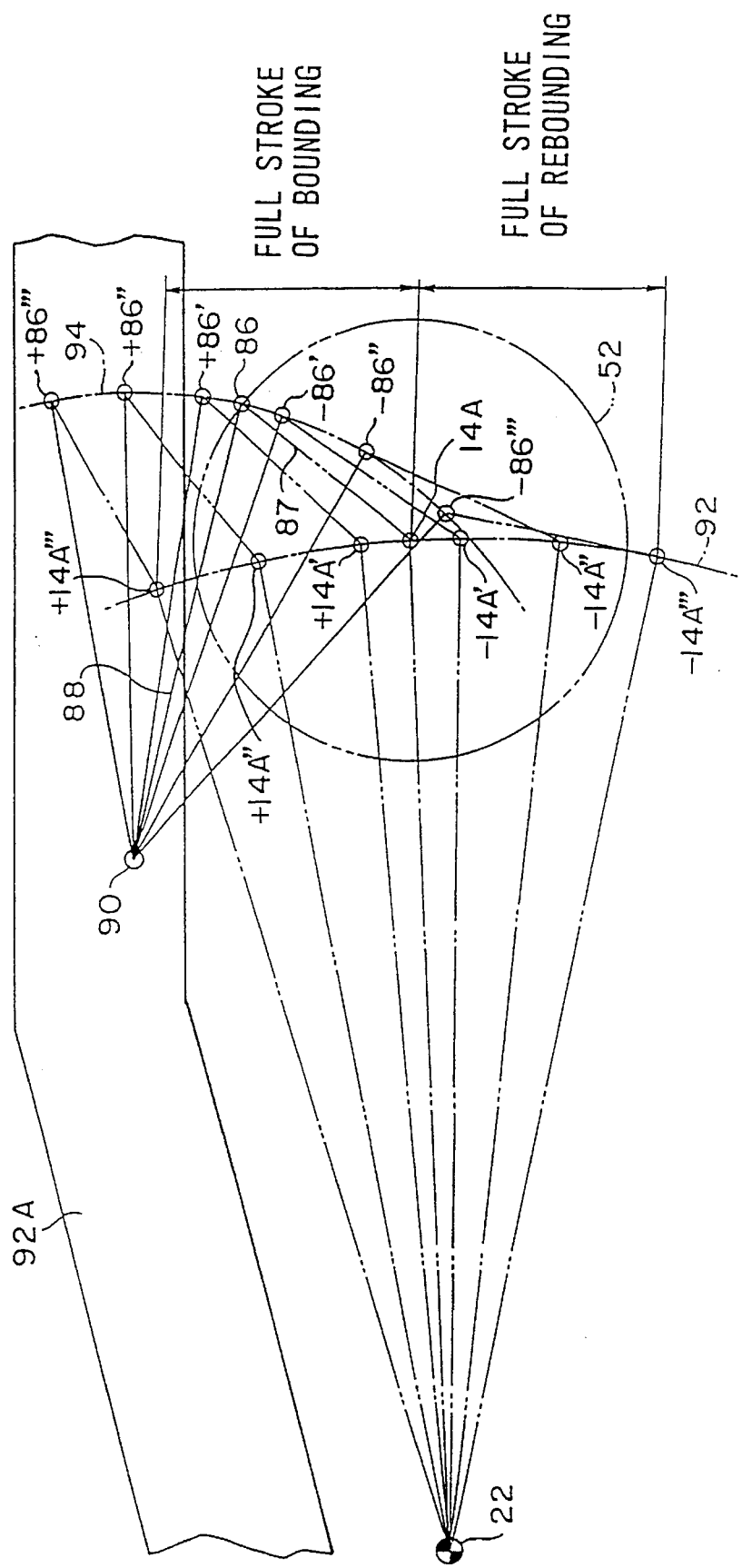
FIG. 5 is a diagram illustrating the operation of an embodiment of the suspension system according to the present invention.

As shown in FIG. 5, the pivoting portion 90 is positioned at approximately the same level as the pivot center of the pivot joint 86 as viewed in the side elevational view of the vehicle when the carrier is at a neutral position of the bounding and rebounding movement thereof. In FIG. 5, the circle 52 represents the rotary-damper positioned at the neutral position, with the central axis 14A thereof being also positioned as shown. When the pivot center of the suspension arm 10 defined by the pivoting means 22 is positioned as shown in FIG. 5, the central axis 14A of the rotary damper 52 moves along an arc trace 92 according to the bounding and rebounding movement of the carrier. On the other hand, when the pivot center of the other end of the connection link 88 is positioned as shown by the point 90 in FIG. 5, the pivot joint 86 moves along an arc trace 94 centered at the point 90. Therefore, when the carrier bounds from its neutral position, the line 87 connecting the damper rotation center 14A and the pivot point 86 and representing the rotary arm provided by the housing 56 shifts to extend between +14A' and +86', +14A" and +86", +14'" and 86'" and so on, such that the housing 56 is progressively rotated clockwise around the central axis 14A. Similarly, when the carrier rebounds from its neutral position, the line 87 shifts to extend between −14A' and −86', −14A" and −86", −14A'" and −86'" and so on, such that the housing 56 is progressively rotated anti-clockwise around the central axis 14A.

In this case, as will be appreciated from FIG. 5, if the link 88 is so arrange that the pivot end 86 is positioned on a first side of the trace 94 to be apart from said damper rotation axis 14A with a first distance (i.e. arm length of the line 87 provided by the housing 56) such that, when the carrier is at the neutral position of the bounding and rebounding movement thereof, the line 87 connecting the damper rotation axis 14A and the pivot end 86 makes an angle of substantially a half of right angle against the trace 94 as viewed in the direction of extension of the wheel rotation axis 14A (i.e. as viewed in FIG. 5), with the link 88 being so long as to have a second distance substantially greater than said first distance and arranged such that the pivot end 90 thereof is positioned on a second side opposite to said first side of said trace 94, then the carrier is allowed to make a relatively large amount of bounding as well as a relatively large amount of rebounding, by a corresponding turn of the link 88 around the pivot point 90 plus a corresponding turn of the housing 56 around the damper ration axis 14A, while said relatively large turn of the housing 56 provides a corresponding relatively large turn between the two relatively rotatable damper members of the rotary damper 52.

In this connection, it is to be noted that, if the pivot point 86 is positioned substantially sideward such that the line 87 extends substantially at right angle to the trace 92 with the pivot end 90 of the link 88 being correspondingly shifted upward to be on or around the trace 92, a higher ratio of the rotation angle of the housing 56 to the bounding or rebounding amount will be obtained. However, in such a construction the amount of bounding and rebounding is each limited to be within the arm length of the housing 56, i.e. the length of the line 87, or much less in order to ensure that the pivot end 86 does not approach too close to the dead point of the crank mechanism.

On the other hand, it is to be noted that, if the pivot point 86 is shifted closer to the top or bottom position of the rotary damper (circle 52) to be on or around the trace 92, the housing 56 will make no longer any substantial rotation according to the bounding and rebounding movement of the carrier.

Therefore, the above-mentioned conditions with regard to the arrangement of the damper 52 and the pivot ends 86 and 90 of the link 88 are particularly desirable to obtain a suspension system in which a relatively large ratio of the angle of rotation of the rotary damper to the amount of bounding or rebounding of the carrier is available together with a relatively large amount of bounding and rebounding of the carrier, although various modifications are possible with respect to the above-mentioned conditions according to various requirements with regard to the performance of each suspension system.

Further, when the carrier is supported by a pivotable suspension arm such as the arm 10 and when the pivot end 90 of the link 88 is positioned on the same side of the trace 92 as the pivot point 22 of the suspension arm 10 as in the embodiment shown in FIG. 5, a further increase of the damping effect during the bounding and rebounding of the carrier is available. In such a construction, since the hub member 32 firmly connected with the free end of the suspension arm 10 is rotated in the direction opposite to the direction of rotation of the housing 56 effected by the link 88 when the carrier bounds or rebounds, the relative rotation angle between the housing 56 and the hub member 32 is further augmented.

Figure 6:
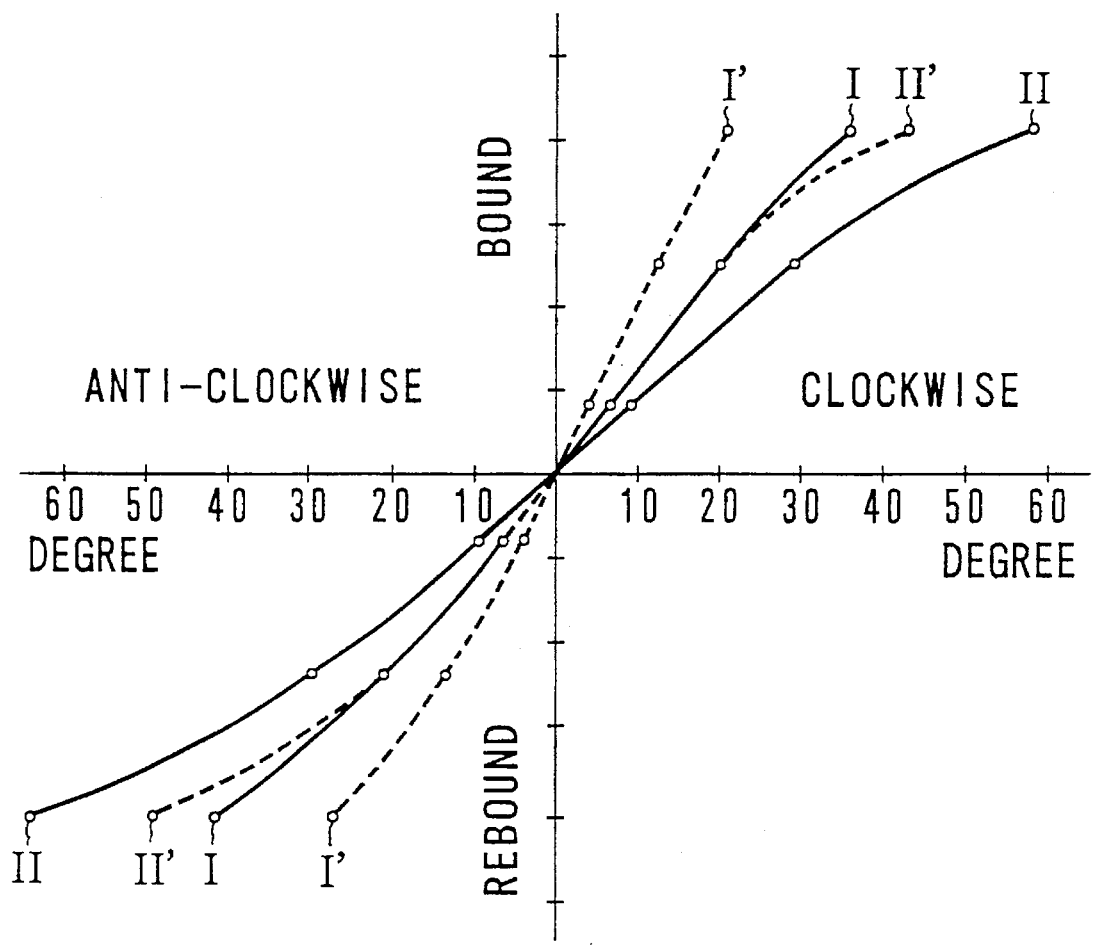
FIG. 6 is a graph showing the performance regarding the angle of rotation between the two relatively rotatable damper members against the amount of bounding and rebounding of the carrier with respect to the embodiments shown in FIGS. 5 and 7.

FIG. 6 shows how the housing 56 rotates relative to the hub member 32 according to the bounding and rebounding of the carrier along the trace 94 in the embodiment shown in FIG. 5. In FIG. 6, curve I shows the rotation angle of the housing 56 relative to the hub member 32 due to the bounding of point 14A to points +14A', +14A" and +14A'" or the rebounding of point 14A to points +14A', −14A" and −14A'". In FIG. 6, curve I' shows the rotation angle of the housing 56 relative to the vehicle body 92A due to the bounding of point 14A to points +14A', +14A" and +14A'" or the rebounding of point 14A to points −14A', −14A" and −14A'". The difference between these two rotation angles by curves I and I' at each corresponding bounding or rebounding state is the rotation angle due to the rotation of the hub member 32 around the pivot point 22.

According to the embodiment shown in FIG. 5, the rotation angle available between the two relatively rotatable damper members of the rotary damper, i.e. the housing 56 and the hub member 32, is generally proportional to the amount of bounding and rebounding of the carrier, and therefore, a substantially constant damping effect will be available throughout the full stroke of the bounding and rebounding movement of the carrier relative to the vehicle body.

However, in some cases it will be more desirable that the rotary damper shows an increasing damping effect as the bounding or rebounding of the vehicle wheel proceeds more from the neutral position. Such a modification of the damping performance is available by modifying the arrangement of the link 88 as shown in FIG. 7, wherein the pivot point 90 is slightly shifted upward from the position in FIG. 5, while the link 88 is made slightly shorter than that in FIG. 5, although the contribution of the shortening of the link 88 to the modification of the performance is much less than the shifting of the pivot point 90.

Figure 7:
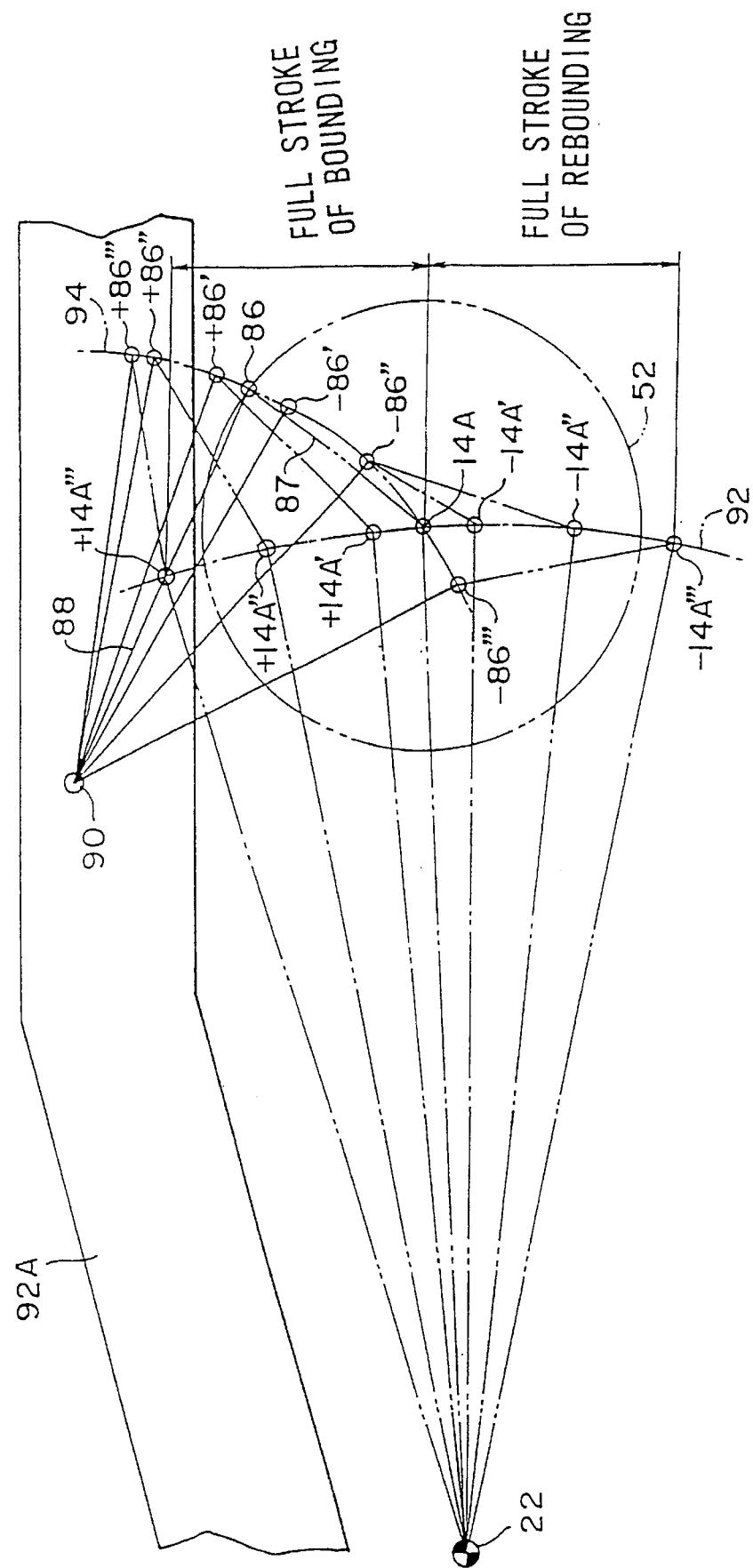
FIG. 7 is a diagram similar to FIG. 5, illustrating the operation of a modification of the suspension system.

In FIG. 6, curve II shows the rotation angle of the housing 56 relative to the hub member 32 due to the bounding of the point 14A to points +14A', +14A" and +14A'" or the rebounding of the point 14A to points −14A', −14A" and −14A'" with respect to the modification shown in FIG. 7. Also in FIG. 6, curve II' shows the rotation angle of the housing 56 relative to the vehicle body 92A due to the bounding of the point 14A to points +14A', +14A" and +14A'" or the rebounding of the point 14A to points −14A', −14A" and −14A'". The difference between the rotation angles by curves II and II' at each corresponding bounding or rebounding state is therefore the rotation angle due to the rotation of the hub member 32 around the pivot point 22. From curves II and II' it will be appreciated that according to this modification the rotation angle available between the housing 56 and the hub 32 increases more rapidly beyond the proportional relationship than the progress of the bounding or rebounding when the amount of bounding or rebounding increases, so as to generate a relatively more increased damping effect at a deep bounding or a high rebounding.

Figure 8:
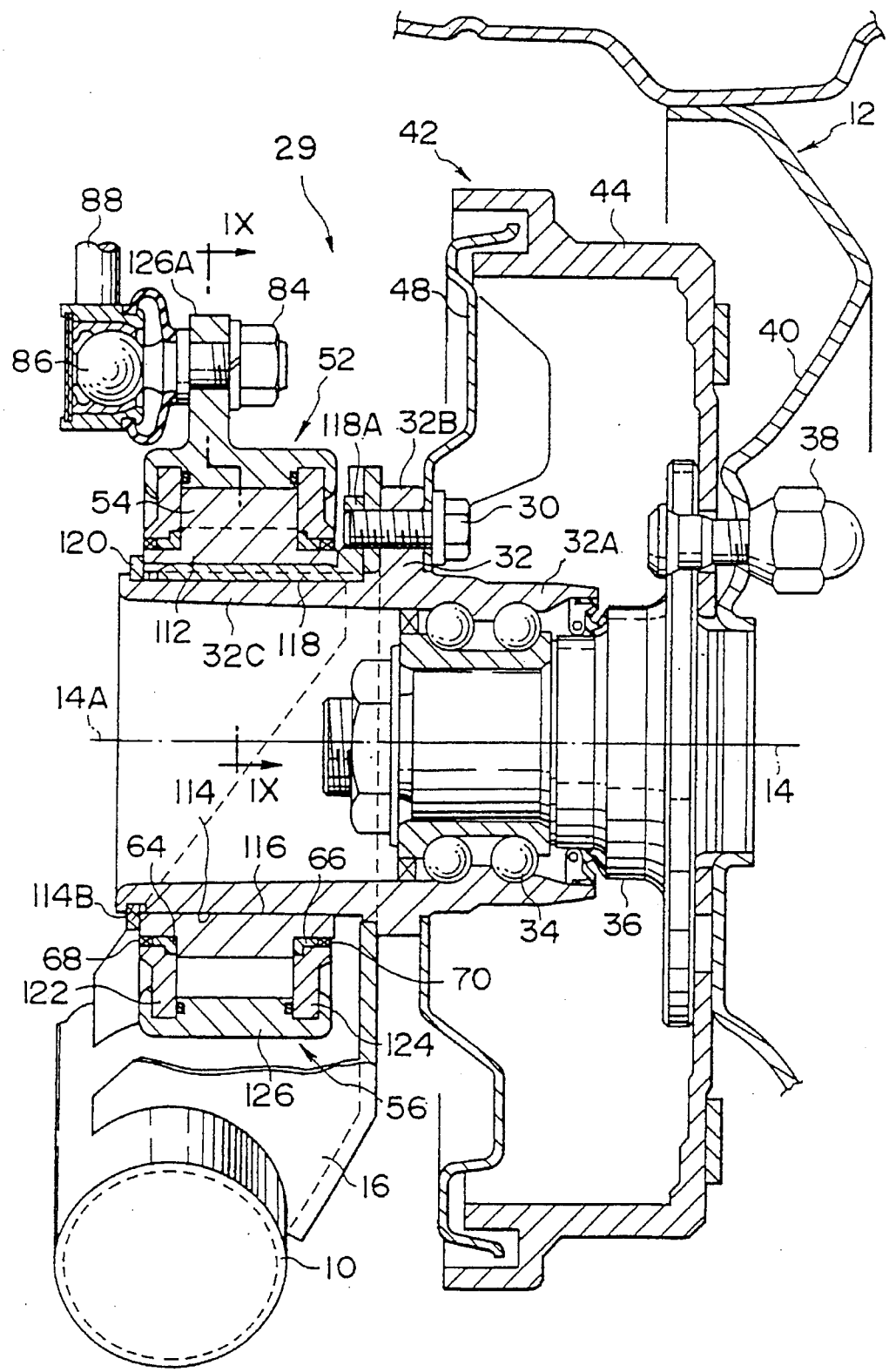
FIG. 8 is a longitudinal sectional view similar to FIG. 2, showing another embodiment of the combination assembly of carrier and rotary damper according to the present invention.
Figure 9:
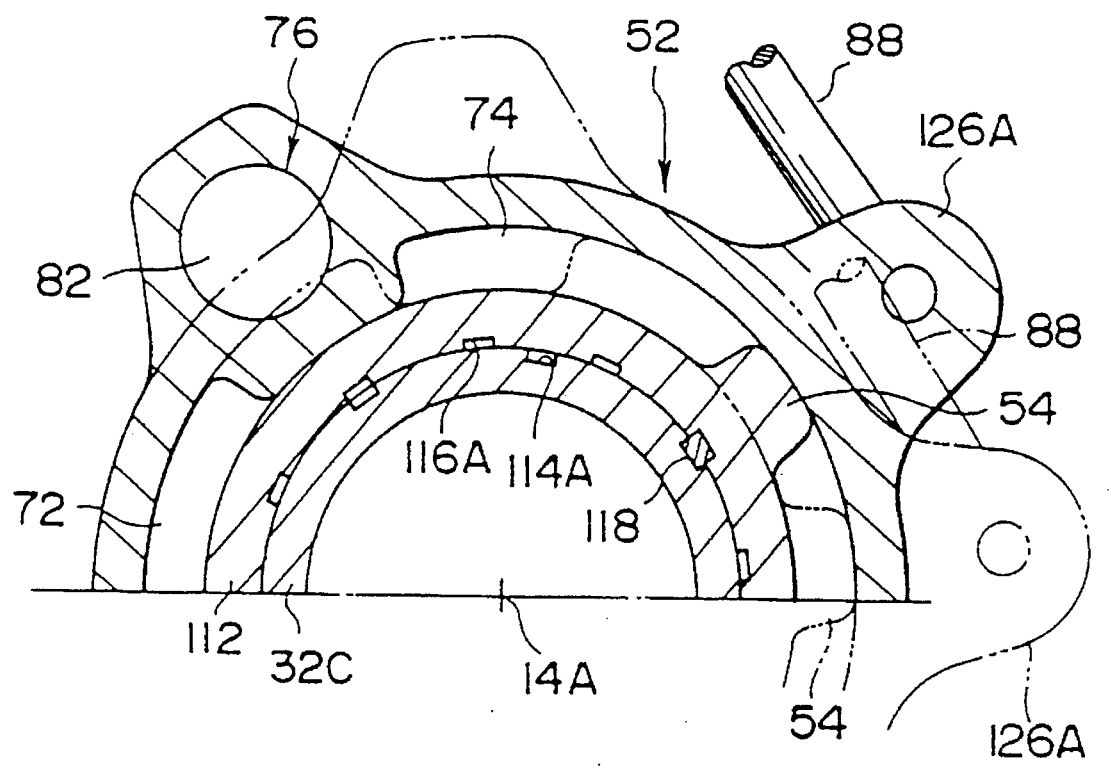
FIG. 9 is a cross sectional view along line IX—IX in FIG. 8, showing a cross section of an essential part of the rotary damper in the combination assembly shown in FIG. 8.
Figure 10:
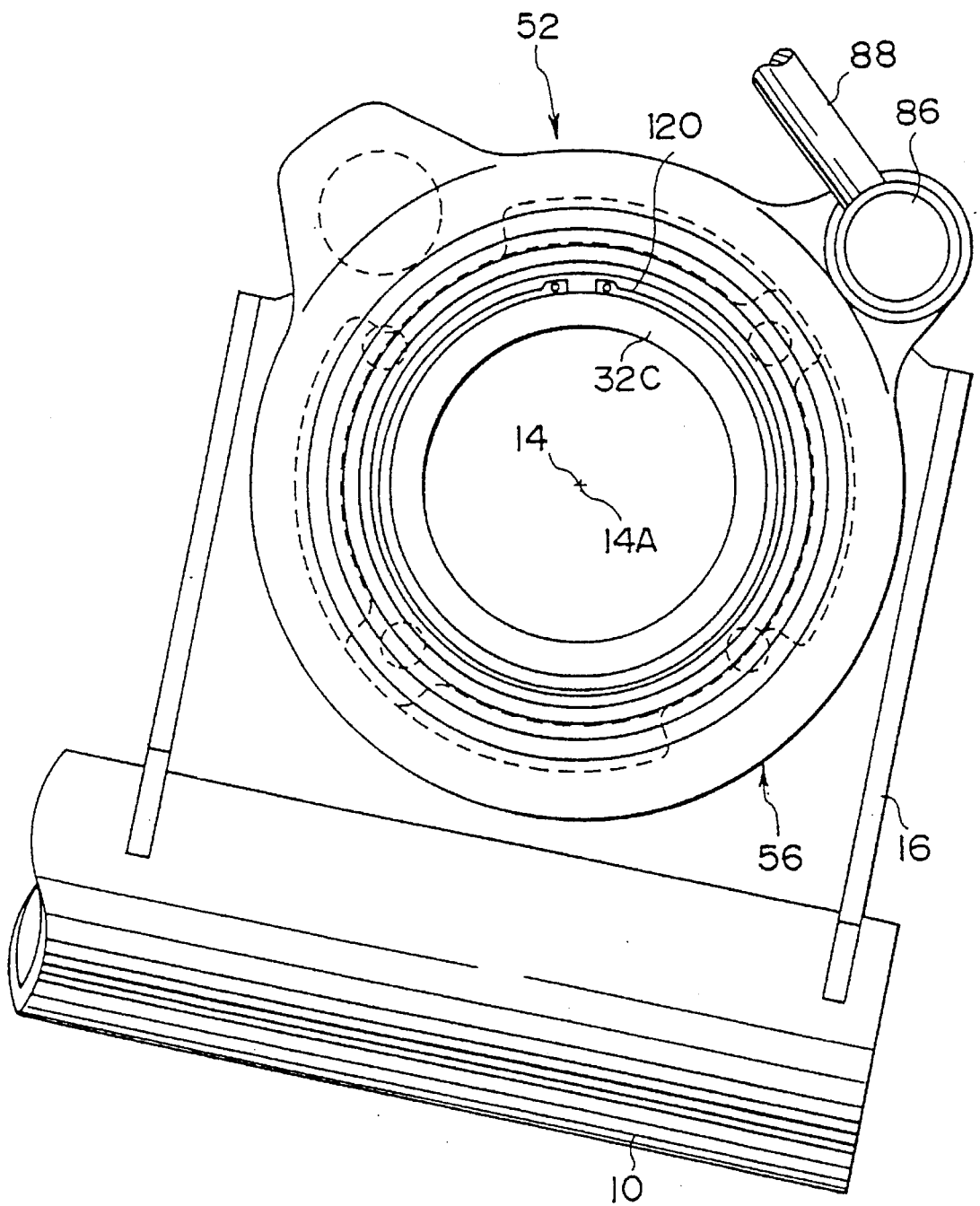
FIG. 10 is a side view of the combination assembly shown in FIG. 8, the side view being a view from the left side to rightward of the combination assembly in FIG. 8.

FIGS. 8, 9 and 10 are views similar to the set of FIGS. 2, 3 and 4, showing another embodiment of the combination assembly of carrier and rotary damper according to the present invention. In these figures, the portions corresponding to those shown in FIGS. 2–4 are designated by the corresponding reference numerals. In this embodiment, the above-mentioned first damper member is constructed as a separate hub member telescopingly assembled with the hub member of the carrier, in contrast to the integral construction in the embodiment shown in FIGS. 2–4.

In more detail, the hub member 32 particular to the carrier has an outboard portion 32A serving principally for rotatably supporting the axle member 36, an inboard portion 32C serving principally for supporting the rotary damper 52 and an intermediate flange portion 32B at which the hub member 32 is firmly connected with the bracket 16 so as to be mounted to the suspension arm 10.

The inboard hub-portion 32C has a cylindrical outer surface 114, around which a hub member 112 adapted to operate as said first damper member is telescopingly mounted with a corresponding cylindrical inner surface 116. The inboard hub portion 32C is formed with a plurality of axially extending key grooves 114A along the cylindrical surface 114, while the damper hub member 116 is formed with a plurality of axially extending key grooves 116A along the cylindrical inner surface 116, at respective circumferential pitches different from one another. By engaging a key 118 between a certain selected pair of grooves 114A and 116B to be fastened by a corresponding one of the bolts 30 at an angle portion 118A thereof, a selection among a plurality of options is available with respect to the angular position of the first damper member relative to the carrier or the suspension arm, so that the same design products are usable to provide different damping strokes according to different types of vehicles. It is desirable that a pair of such keys 118 are provided at diametrically opposite positions around the central axis 14A. The grooves 114A and 116A left open with no keys 118 being received therein serve to ventilate air therethrough, thus contributing to cooling the damper during high load operation thereof. The axial movement of the damper hub member 112 relative to the inboard hub portion 32C is fixed by the angle portion 118A of the key 118 and a fastening ring 120 engaged into an annular groove 114B formed in the inboard hub member 32C adjacent the inboard end thereof.

In this embodiment, the housing 56 providing the above-mentioned second damper member is constructed by a flanged annular member 126 and a pair of annular side wall members 122 and 124 which are assembled together around the hub member 112, wherein the pair of annular side wall members 122 and 124 are arranged to hold a central raised portion of the hub member 112 including vane projections 54 with incorporation of bearing elements 64 and 66 and calked to the member 126 adjacent axial opposite ends thereof. The slidable engagements between the housing 56 and the hub member 112 by the bearing elements 64 and 66 are sealed by seal elements 68 and 70. The ball joint 86 is mounted to a flanged portion 126A of the housing member 126 by a nut 84 in the same manner as in the former embodiment.

When the rotary damper 52 is constructed to have the damper hub member 112 separate from the carrier hub member 32 and telescopingly mounted therearound, the rotary damper and the carrier structure are more conveniently manufactured separately and assembled together, while in the maintenance thereafter the two parts can be separately disassembled for more convenient maintenance work. As will be appreciated from the constructions described above, the rotary damper 52 can be readily disassembled from the carrier by the ring 120 being removed and being axially shifted out of the carrier hub member 32.

Figure 11:
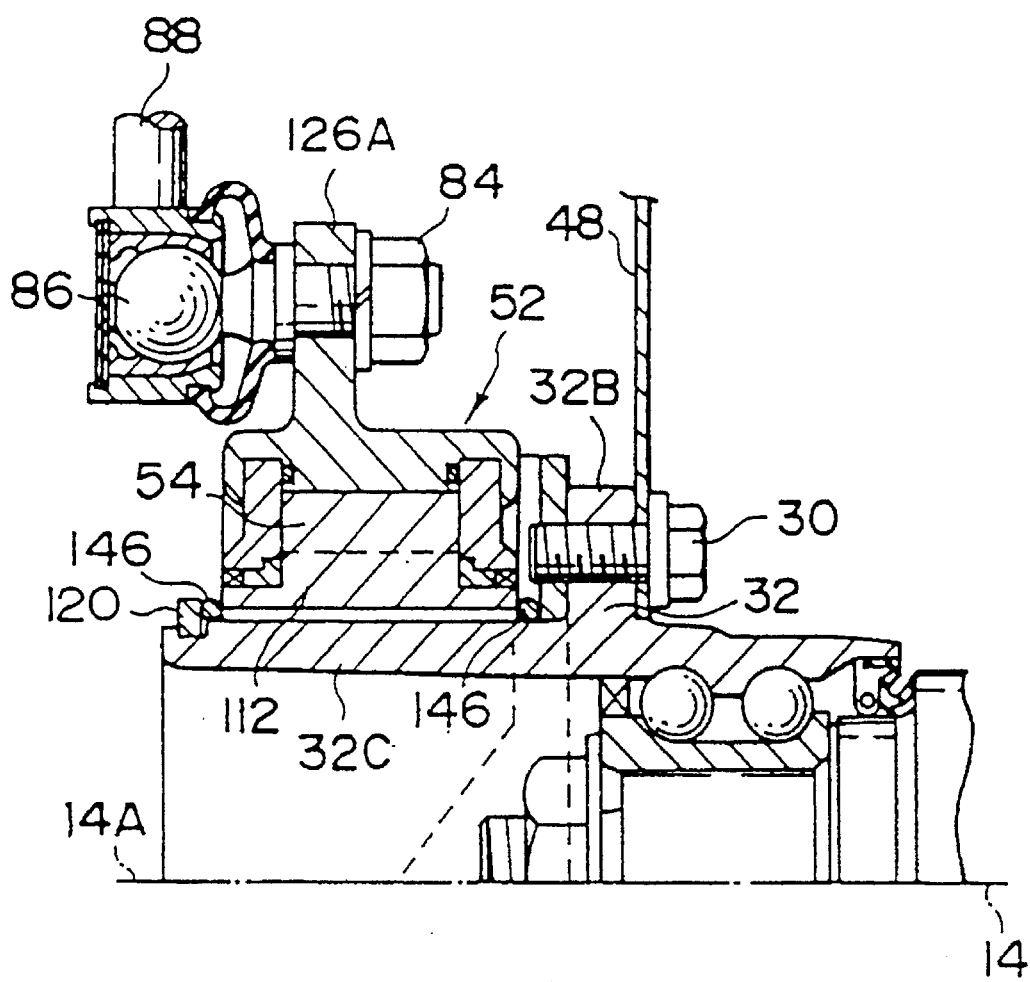
FIG. 11 is a view corresponding to a part of FIG. 8, showing a modification of the construction shown in FIG. 8.

FIG. 11 is a view corresponding to a part of FIG. 8, showing a modification of the construction shown in FIG. 8. In this modification, the inboard hub portion 32C and the damper hub member 112 are mutually telescopingly engaged at splined portions formed at the respective outer and inner wall portions against relative rotation. Further, in this modification, the inboard hub member 32C and the damper hub member 112 are not firmly fixed to one another against axial relative movements, but are elastically held against axial relative movements by a pair of elastic rings 146. Such an elastic axial holding between the rotary damper and the carrier contributes to a reduction of vibration and noise and also to a reduction of wearing of the damper members.

Figure 12:
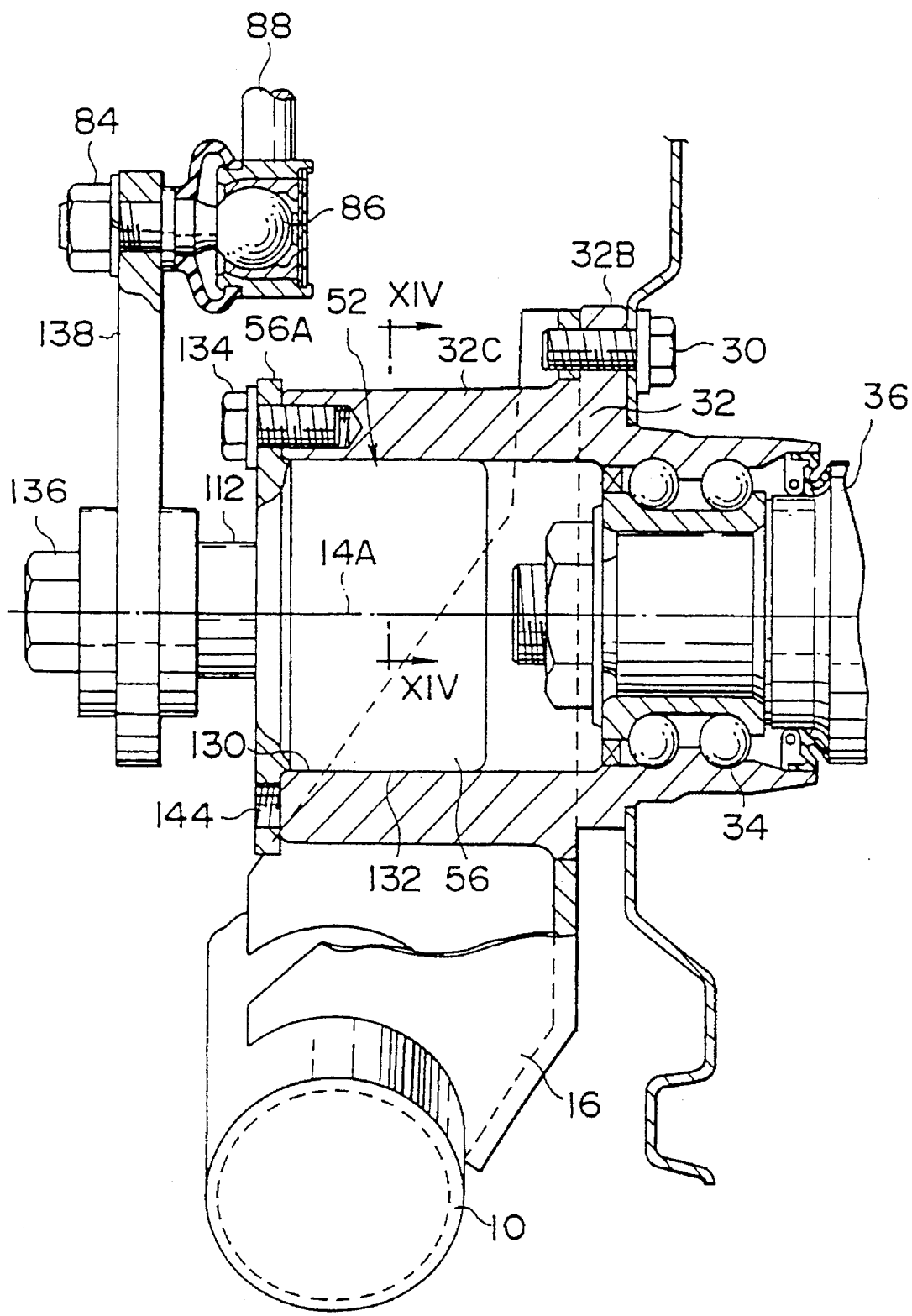
FIG. 12 is a longitudinal sectional view showing still another embodiment of the combination assembly of carrier and rotary damper according to the present invention.
Figure 13:
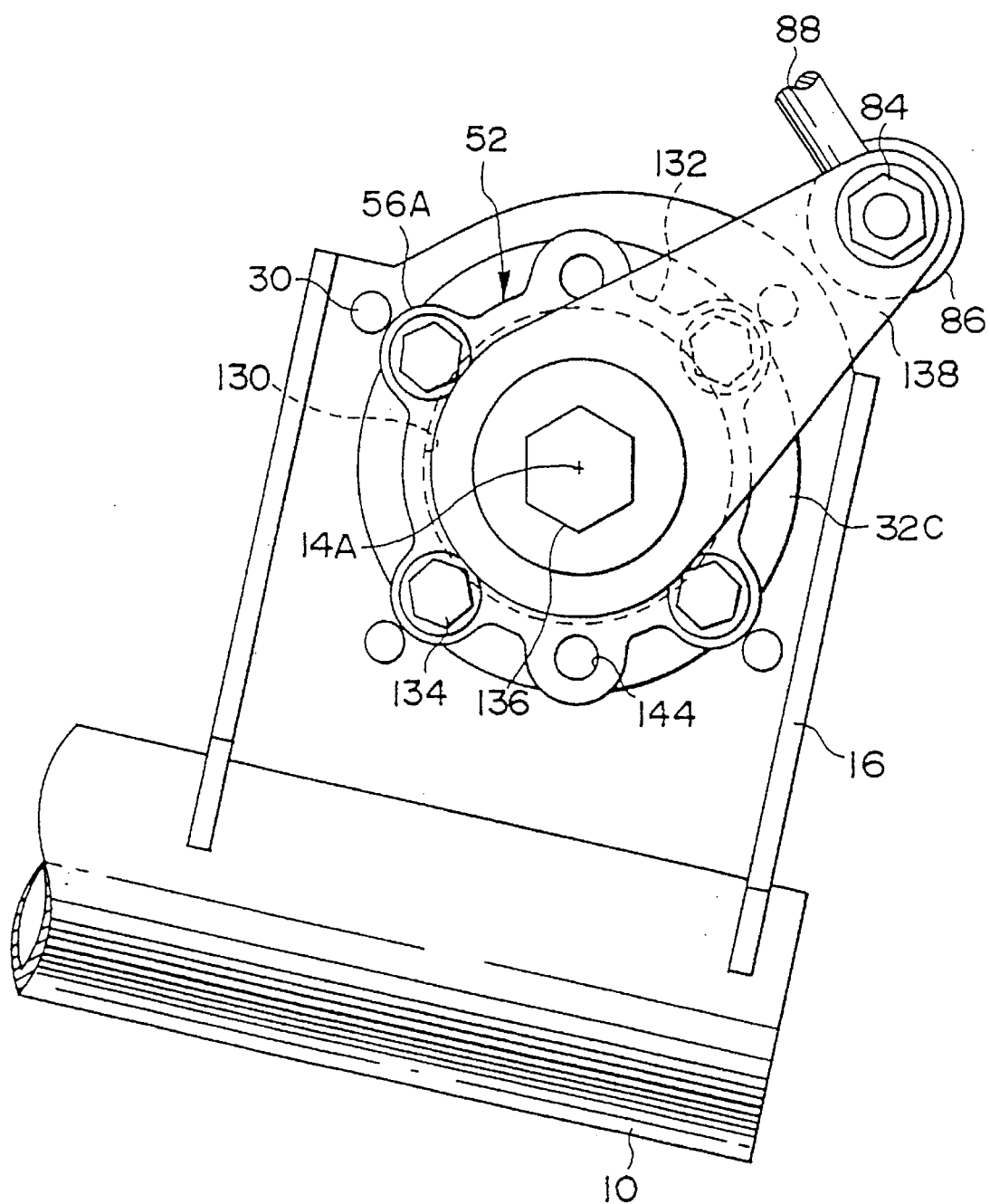
FIG. 13 is a side view of the combination assembly shown in FIG. 12, the side view being a view from the left side to rightward of the combination assembly in FIG. 12.
Figure 14:
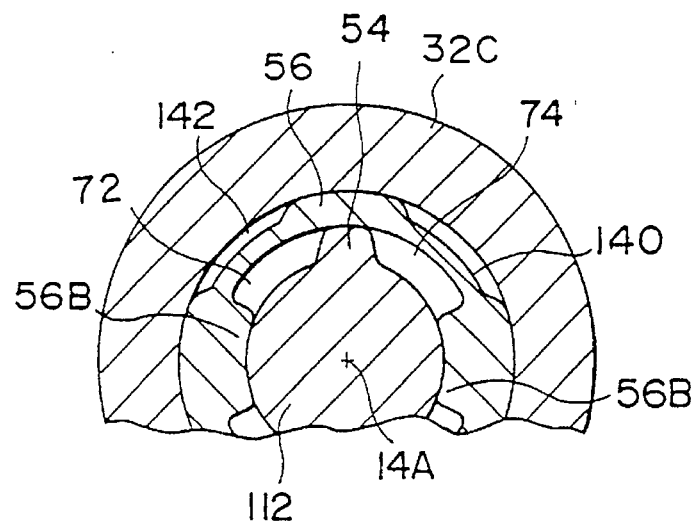
FIG. 14 is a cross sectional view along line XIV—XIV in FIG. 12, showing a cross section of an essential part of the rotary damper in the combination assembly shown in FIG. 12.

FIGS. 12, 13 and 14 are views similar to the set of FIGS. 2, 3 and 4, or FIGS. 8, 9 and 10, showing still another embodiment of the combination assembly of carrier and rotary damper according to the present invention. In these figures, the portions corresponding to those shown in FIGS. 2–4 or FIGS. 8–10 are designated by the corresponding reference numerals. In this embodiment, the above-mentioned first damper member is constructed as a housing member telescopingly assembled into the hub member of the carrier, in contrast to the integral construction in the embodiment shown in FIGS. 2–4, and also in contrast to the telescoping assembly construction shown in FIGS. 8–10 in which the rotary damper is mounted around the carrier hub member.

In more detail, the hub member 32 particular to the carrier also has an outboard portion 32A serving principally for rotatably supporting the axle member 36, an inboard portion 32C serving principally for supporting the rotary damper 52 and an intermediate flange portion 32B at which the hub member 32 is firmly connected with the bracket 16 so as to be mounted to the suspension arm 10.

On the other hand, a rotary damper 52 is mounted into the inboard hub portion 32C as engaged to the inner cylindrical wall surface thereof with an outer generally cylindrical wall surface of a housing 56 thereof which, in this case, is the above-mentioned first damper member adapted to firmly mounted to the carrier hub portion. The housing 56 has a flange portion 56A at an axial end thereof adapted to abut the inboard end of the inboard hub portion 32C and is fastened to the carrier hub 32 by four bolts 134.

A shaft member 112, which is said second damper member according to the above-mentioned definition of the combination assembly of carrier and rotary damper, is formed to have an extension to support a crank arm 138 mounted thereto by a nut 136 fastened to a threaded end thereof, and the ball joint 86 provided at the end of the connection link 88 is mounted to an outer end of the crank arm 138 by a nut 84 so as to be substantially remote from the central axis 14A, thereby providing an arm length corresponding to the line element 78 in FIG. 5.

As shown in FIG. 14, the housing 56 is formed with recesses 140 along the outer cylindrical surface thereof to provide clearances 142 at portions corresponding to opposite end portions of the damper chamber spaces 72 and 74 defined between bearing portions 56B at which the shaft member 112 is rotatably supported by the housing 56. By such recesses 140 being so formed as to correspond to the opposite end portions of the damper chamber spaces 72 and 74, when the vane projection 54 approaches either of these opposite end portions of the chamber spaces due to a large bounding or rebounding, the housing wall is bulged radially outwardly so as to increase the clearance between the vane projection 54 and the inner wall surface of the housing wall. This provides a desirable damping performance that the damping effect is attenuated near the full bounding or the full rebounding. The position of the recess 140 may be changed to other circumferential positions relative to the damper chamber space 72 or 74 such that other modifications are available with respect to the performance of the amount of bounding or rebounding versus the damping strength.

For the convenience of disassembling the rotary damper 52 from the carrier construction, a pair of threaded bores 144 are formed at the flange portion 56A of the housing 56. When the rotary damper is to be disassembled, a screw not shown in the figure is turned into each of these threaded bores such that the rotary damper, i.e. the housing 56 thereof, is drawn axially out of the cylindrical bore of the inboard hub portion 32C of the carrier hub member 32.

Since the housing 56 is confined in the cylinder construction of the inboard hub portion 32C all around thereof, any unbalanced deformation of the housing 56 from the standard circular configuration thereof is firmly restricted by the cylinder construction of the inboard hub portion 32C, and therefore, in spite of the reduction of the wall thickness by the formation of the recesses 140, the overall cross sectional configuration of the housing 56 is stably maintained such that the postilion of each of the bearing portions 56B relative to the other thereof is stably balanced, thereby providing a stabilized deformation performance of the housing wall which modifies the above-mentioned clearance according to the progress of the bounding or rebounding movement. Alternatively, when no recesses such as 140 are provided, a relatively thin housing 56 can provide a firm housing construction of the rotary damper.

Figure 15:
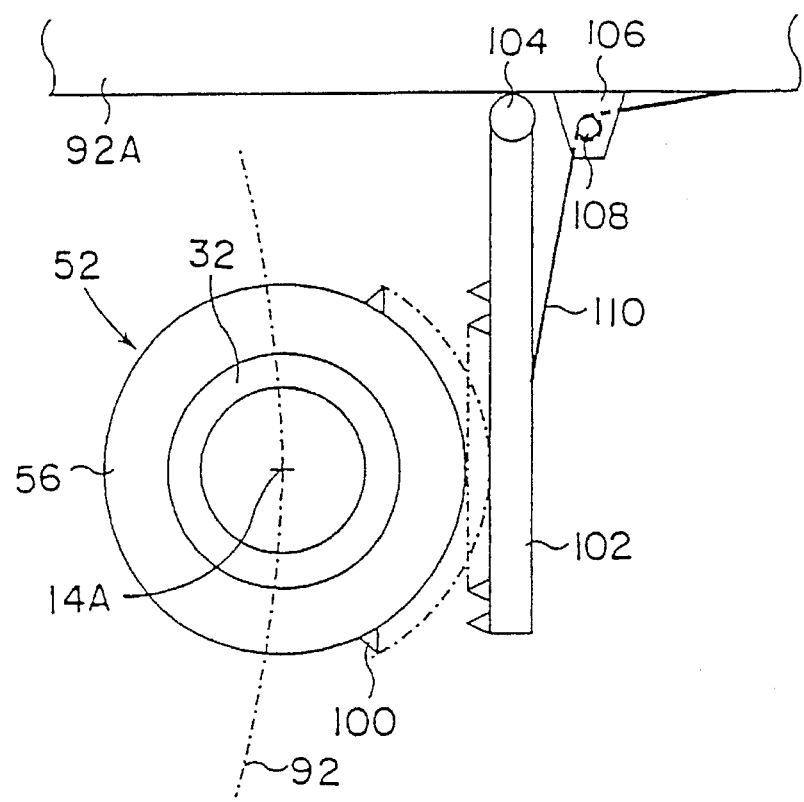
FIG. 15 is a substantially diagrammatical view showing still another embodiment of the suspension system according to the present invention.

FIG. 15 shows another embodiment of the present invention. According to this embodiment, the displacement of the center of the rotary damper due to the bounding and rebounding movements of the vehicle wheel relative to the vehicle body is converted into the corresponding rotation of the housing 56 by a series of gear teeth 100 provided in the housing 56 meshing with a rack bar 102 having a corresponding series of rack teeth and pivotably mounted to the vehicle body at an upper end 104 thereof. Also in FIG. 15, the portions corresponding to those shown in the preceding figures are designated by the corresponding reference numerals. The rack bar 102 is biased by a leaf spring 110 pivotably supported at an intermediate portion thereof by a pivot shaft 108 supported from the vehicle body 92A via a bracket 106 so that the rack teeth are pressed against the teeth 100 of the housing 56. In this embodiment, the rate of increase of the rotation angle of the housing around the central axis 14A according to the bounding and rebounding remains substantially constant. However, this embodiment has an advantage that the link mechanism forms no longer an inertial mass to affect the stability of alignment of the suspension system during the bounding and rebounding movement of the vehicle wheel.

Although the present invention has been described in detail in the above with respect to some particular embodiments thereof, it will be apparent for those skilled in the art that various modifications are possible with respect to the shown embodiments within the scope of the present invention.

I claim:

1. A suspension system of a vehicle having a vehicle body and at least one vehicle wheel, comprising:

a carrier for supporting said vehicle wheel to be rotatable about an axis of rotation thereof;

a means resiliently supporting said carrier against said vehicle body for a bounding and rebounding movement of said vehicle wheel relative to said vehicle body; and a damping means for damping said bounding and rebounding movement of said vehicle wheel relative to said vehicle body, said damping means comprising:

a rotary damper having a first damper member firmly connected with said carrier, a second damper member rotatable relative to said first damper member about an axis of rotation thereof, and a means for damping a relative rotation movement of said first and second damper members about said damper rotation axis, and a reaction member supporting a portion of said second damper member substantially remote from said damper rotation axis against a portion of said vehicle body such that said bounding and rebounding movement of said carrier relative to said vehicle body causes a corresponding rotation movement of said second damper member relative to said first damper member about said damper rotation axis, wherein said first damper member of said rotary damper is incorporated in said carrier such that said damper rotation axis is in alignment with said wheel rotation axis.

2. A suspension system according to claim 1, wherein said reaction member comprises a link member having a first end pivotably connected with said second damper member at said portion thereof substantially remote from said damper rotation axis and a second end remote from said first end thereof and pivotably connected with said vehicle body, said first pivot end of said link member being positioned on a first side of a trace of said wheel rotation axis in the bounding and rebounding movements of said carrier to be apart from said wheel rotation axis with a first distance such that a line connecting said damper rotation axis and said first pivot end makes an angle of substantially a half of right angle against said trace as viewed in a direction of extension of said wheel rotation axis when said carrier is at a neutral position of the bounding and rebounding movement thereof, while said second end of said link member is remote from said first pivot end thereof with a second distance substantially greater than said first distance and positioned on a second side opposite to said first side of said trace.

3. A suspension system according to claim 2, wherein said carrier supporting means comprises a suspension arm member having a first end firmly connected with said carrier and a second end pivotably connected with a portion of said vehicle body and extending substantially in a longitudinal direction of the vehicle such that said trace of said wheel rotation axis in the bounding and rebounding movement of said carrier is an arc, said second end of said link member pivotably connected with the vehicle body being positioned on the same side as said second end of said suspension arm member pivotably connected with the vehicle body with respect to said arc trace.

4. A suspension system according to claim 1, wherein said carrier has an annular hub member, and a spindle member supported by said hub member to be rotatable about said wheel rotation axis, said first damper member being formed as an integral part of said hub member, with said second damper member being formed as a housing member mounted around said hub member.

5. A suspension system according to claim 1, wherein said carrier has an annular hub member, and a spindle member supported by said hub member to be rotatable about said wheel rotation axis, said first damper member being formed as a damper hub member telescopingly mounted around said annular hub member of said carrier such that an inner cylindrical surface of said damper hub member engages an outer cylindrical surface of said annular hub member, with said second damper member being formed as a housing member mounted around said damper hub member of said rotary damper.

6. A suspension system according to claim 5, wherein said annular hub member and said damper hub member are each formed with a plurality of axial grooves along said outer and inner cylindrical surfaces thereof at respective circumferential pitches different from one another, and a key is engaged through a selected pair of one of said axial grooves formed in said annular hub member and one of said axial grooves formed in said damper hub member.

7. A suspension system according to claim 1, wherein said carrier has an annular hub member, and a spindle member supported by said hub member to be rotatable about said wheel rotation axis, said first damper member being formed as a housing member telescopingly mounted within said hub member of said carrier such that an outer cylindrical surface of said housing member engages an inner cylindrical surface of said carrier hub member, with said second damper member being formed as a shaft member mounted in said housing member.

8. A suspension system according to claim 7, wherein said shaft member carries a crank arm at a first end thereof to provide said portion of said second damper member substantially remote from said damper rotation axis at a second end thereof opposite to said first end thereof.

9. A suspension system according to claim 7, wherein at least one recess is formed along said outer cylindrical surface of said housing member at a position selected in relation to a damper chamber space of said rotary damper.

10. A suspension system according to claim 1, wherein said second damper member has a series of gear teeth centered at said damper rotation axis, while said reaction member is a rack member having a first end pivotably mounted to said vehicle body and a series of rack teeth engaged with said gear teeth of said second damper member such that said second damper member is driven into a corresponding rotation movement about said damper rotation axis by said rack member when said carrier makes a bounding and rebounding movement relative to said vehicle body.

* * * * *